United States Patent [19]

Kaga et al.

[11] Patent Number: 5,643,497
[45] Date of Patent: Jul. 1, 1997

[54] AQUEOUS ZIRCONIA SOL AND METHOD OF PREPARING SAME

[75] Inventors: Takao Kaga; Yutaka Kimura, both of Funabashi; Fumio Saito, Sodegaura; Hiroaki Tanaka, Tokyo, all of Japan

[73] Assignee: Nissan Chemical Industries, Ltd., Tokyo, Japan

[21] Appl. No.: 460,593

[22] Filed: Jun. 2, 1995

[30] Foreign Application Priority Data

Jun. 17, 1994 [JP] Japan .................. 6-135611

[51] Int. Cl.$^6$ .................................................. B01J 13/00
[52] U.S. Cl. ............... 252/313.1; 51/309; 106/38.27; 106/450; 252/314
[58] Field of Search .......................... 252/313.1, 314; 51/309; 106/38.27, 450

[56] References Cited

U.S. PATENT DOCUMENTS

| | | | |
|---|---|---|---|
| 2,624,661 | 1/1953 | Miller | 51/309 |
| 2,984,628 | 5/1961 | Alexander et al. | 252/313.1 |
| 4,242,842 | 1/1981 | Yancey | 51/309 X |
| 5,004,711 | 4/1991 | Grodek | 252/313.1 X |
| 5,037,579 | 8/1991 | Matchett | 252/313.1 |
| 5,223,176 | 6/1993 | Obitsu et al. | 252/313.1 |

FOREIGN PATENT DOCUMENTS 2-167826  6/1990  Japan .

*Primary Examiner*—Richard D. Lovering
*Attorney, Agent, or Firm*—Oliff & Berridge

[57] ABSTRACT

A stable aqueous sol of colloidal zirconia having lowered surface activity and useful for polishing semiconductors and the like, is prepared by a process comprising calcining a colloidal zirconia having a specific surface area of 10 to 400 $m^2/g$, a particle size of 20 to 500 nm and a dehydratable water content of 4 to 15% by weight at 400° to 1,000° C. to form a calcined zirconia having a dehydratable water content of 0.1 to 2% by weight, and pulverizing the calcined zirconia in the presence of a water-soluble acid or alkali in water, to form the stable sol of colloidal zirconia having a specific surface area of 5 to 200 $m^2/g$, a particle size of 20 to 1,500 nm and a dehydratable water content of 0.1 to 3% by weight. The stable sol of colloidal zirconia has a $ZrO_2$ concentration of 5 to 80% by weight.

8 Claims, No Drawings

AQUEOUS ZIRCONIA SOL AND METHOD OF PREPARING SAME

BACKGROUND OF THE INVENTION

1. Field of the Invention

The present invention relates to an aqueous sol of zirconia having lowered activity and a method of preparing the sol, and is more specifically directed to a stable aqueous sol of colloidal zirconia having a particle size of 20 to 1,500 nm and such a lowered surface activity that the colloidal zirconia, when adhered to a surface of a material, is removed from the surface by cleansing the material in water. The invention also relates to a method of preparing the sol.

2. Description of Related Art

U.S. Pat. No. 2,984,628, discloses a stable and acidic aqueous sol of a dense and ultimate particle of colloidal zirconia having a mean particle size (D) of 5 to 200 nm as observed by an electronic microscope, a specific surface area (A) of 5 to 400 in $m^2/g$ as measured by the nitrogen gas adsorption method and a relationship $A \times D = 1,000$ to $2,000$. The sol is prepared by a method comprising heating an aqueous solution of a salt of zirconyl at a temperature of 120° to 300° C. under pressure to cause the salt to hydrolyze.

Japanese laid-open patent publication No. Hei 2-167826 (1990) discloses a stable and alkaline aqueous sol of colloidal zirconia. The sol is prepared by a method comprising adding to an acidic aqueous sol of colloidal zirconia having a particle size of 50 nm an organic compound having a hydroxyl group which is soluble in water, and then adding to the resultant sol a basic compound so that a sol having a pH of 6 to 14 is formed.

The colloidal particles of zirconia in the sols as disclosed in these references and related prior art remain on a surface of a material such as, for example, a semiconductor material, with the colloidal particles adhered to the surface when the material is polished with the sols and thereafter rinsed with water, or remain on inner walls of containers with the colloidal particles adhered thereto when the sols have been contacted in the containers when the containers are empty and thereafter rinsed with water. Hence the colloidal particles of zirconia in the prior art are characterized as having a high surface activity or as having a highly active surface.

SUMMARY OF THE INVENTION

It is one object of the present invention to provide a stable aqueous sol of colloidal zirconia which has such a lowered surface activity that the colloidal zirconia, following adherence to a surface of a material, is easily removed from the surface by cleansing the surface with or in water.

It is another object of the present invention to provide a method of preparing a stable aqueous sol of colloidal zirconia having such a lowered surface activity.

There is provided, according to the present invention, a stable aqueous sol of colloidal zirconia, the colloidal zirconia having a specific surface area of 5 to 200 $m^2/g$ as measured by the nitrogen gas adsorption method and a particle size of 20 to 1,500 nm as measured by the dynamic light scattering method. A characteristic of the colloidal zirconia of the sol is that if the sol is dried at 150° C. for 3 hours, to obtain a dried powder of colloidal zirconia, the dried powder shows a decrease in weight, by dehydration, of 0.1 to 3% by weight of the dried powder when the dried powder is fired at 1,100° C. for 1 hour. In other words, the colloidal zirconia of the sol has a dehydratable water content of 0.1 to 3% by weight. The sol contains the colloidal zirconia in an amount of 5 to 80 % by weight as $ZrO_2$ and a water-soluble acid in an amount of 0.01 to 100 milli equivalent or a water-soluble alkali in an amount of 1 to 100 milli equivalent to 1 mol of $ZrO_2$ of the colloidal zirconia.

The method of preparing a stable aqueous sol of colloidal zirconia, according to the present invention, comprises the following:

calcining a colloidal zirconia of a starting aqueous zirconia sol, wherein said colloidal zirconia has a specific surface area of from 10 to 400 $m^2/g$, a particle size of from 20 to 500 nm, and a dehydratable water content of from 4 to 15 percent by weight, the calcining occurring at a temperature of from 400° C. to 1,000° C. for 0.05 to 50 hours to form a calcined zirconia having a dehydratable water content of from 0.1 to 2 percent by weight, and pulverizing the calcined zirconia in water and in the presence of a water-soluble acid or water-soluble alkali, said calcined zirconia being present in the water in a concentration of from 5 to 80 percent by weight of $ZrO_2$ in the calcined zirconia, and said water-soluble acid being present in an amount of from 0.01 to 100 milli equivalent per 1 mol of $ZrO_2$ in the calcined zirconia or said water-soluble alkali being present in an amount of from 1 to 100 milli equivalent per 1 mol of $ZrO_2$ in the calcined zirconia, said pulverizing continuing until an aqueous sol containing colloidal zirconia having a particle size of from 1 to 3 times the particle size of the colloidal zirconia before calcining is formed.

The colloidal zirconia of the starting sol has a characteristic that if the colloidal zirconia is dried at a temperature of 150° C. for a time of 3 hours to obtain a dried zirconia powder, the dried powder shows a decrease in weight, by dehydration, of 4 to 15% by weight of the dried powder when the dried powder is fired at a temperature of 1,100° C. for a time of 1 hour. In other words, the colloidal zirconia of the starting sol has a dehydratable water content of 4 to 15% by weight.

The calcined zirconia has a characteristic that if the calcined zirconia is dried at a temperature of 150° C. for a time of 3 hours to obtain a dried calcined zirconia powder, the dried powder shows a decrease in weight, by dehydration, of 0.1 to 2% by weight of the dried powder when the dried powder is fired at a temperature of 1,100° C. for a time of 1 hour. In other words, the calcined zirconia, prior to pulverizing, has a dehydratable water content of 0.1 to 2% by weight.

DETAILED EXPLANATION OF THE INVENTION

The specific surface area of the colloidal zirconia is measured by the conventional nitrogen gas adsorption method. The particle size of the colloidal zirconia is measured by the dynamic light scattering method by using a commercially available apparatus, for example, an apparatus named $N_4$ manufactured by Coulter Co. of the U.S.A. The amount of water-soluble acid or water-soluble alkali contained in the sol, in the powder of colloidal zirconia, in the calcined zirconia and in the zirconia after firing is measured by chemical analysis known in the art.

The stable aqueous sol of colloidal zirconia of the present invention is prepared, in essence, by a method in which a starting sol of colloidal zirconia or the colloidal zirconia in a form of a powder obtained by drying the starting sol of colloidal zirconia at a temperature of, for example, 80° to 200° C., is calcined thereby to form a calcined zirconia, and a step in which the calcined zirconia is pulverized in the presence of an acid or an alkali in water.

The colloidal zirconia in the starting sol may have a specific surface area of 10 to 400, preferably 20 to 300 and more preferably 50 to 200 m$^2$/g as measured by the nitrogen gas adsorption method, and a particle size of 20 to 500, preferably 50 to 400 and more preferably 70 to 300 nm as measured by the light scattering method. The colloidal zirconia of the starting sol has a characteristic that if the colloidal zirconia is dried at a temperature of 150° C. for a time of 3 hours to obtain a dried zirconia powder, the dried powder shows a decrease in weight, by dehydration, of 4 to 15% by weight of the dried powder when the dried powder is fired at a temperature of 1,100° C. for a time of 1 hour. In other words, the colloidal zirconia of the starting sol has a dehydratable water content of 4 to 15% by weight.

The starting sol of colloidal zirconia may be prepared in a method known in the art such as, for example, a method comprising heating a salt of zirconium in an aqueous medium to cause hydrolysis of the salt and to form the colloidal zirconia in the medium, as is disclosed in U.S. Pat. No. 2,984,628. The starting sol may preferably be prepared by a process in which an aqueous solution of a salt of zirconium such as, for example, zirconium oxychloride, zirconium nitrate, zirconium sulfate or zirconium acetate in a concentration of 0.01 to 2 mol of Zr in ion per liter of water is heated at a temperature of 100° to 200° C. under pressure for a time of 1 to 100 hours, thereby to form an acidic aqueous sol of colloidal zirconia. A starting sol in purified form can be obtained by ultrafiltering the acidic sol. A starting sol in alkaline form can be obtained by adding an alkaline substance to the acidic sol, as is disclosed in Japanese laid-open patent publication No. Hei 2-167826.

The starting sol may be dried at a temperature of, for example, 80° to 200° C., preferably 100° to 150° C. in a dryer, preferably a spray dryer, to form a powder of colloidal zirconia having a specific surface area of 10 to 400 m$^2$/g and a particle size of 20 to 500 nm. An aqueous zirconia slurry in a neutral pH range in which the particle of zirconia is in a form of aggregation of the colloidal zirconia can be obtained by neutralizing the acidic sol with an alkaline substance.

The powder of colloidal zirconia decreases in weight when the powder is again dried at a higher temperature, and the powder further decreases in weight even when it is calcined at a higher temperature, for example, 500° C. However, the powder after firing at a temperature of 1,100° C. shows no decrease in weight when the powder after firing is again fired at a temperature over 1,100° C. It was found that the decrease in weight of the powder is due to the release of water by dehydration from the powder as well as the release of volatile components other than water such as the acid, the alkali or the salt contained in the powder.

The amount (H) of water which is dehydratable from the powder of starting colloidal zirconia is obtained by measuring the weight ($W_1$) of the powder and the content ($C_1$) of the volatile component other than $H_2O$ in the powder after the powder is dried at 150° C. for 3 hours, and again measuring the weight ($W_2$) of the powder and the content ($C_2$) of the volatile component other than $H_2O$ in the powder after the powder is fired at 1,100° C. for 1 hour, and determining H according to the equation $H=(W_1-C_1)-(W_2-C_2)$. The amount of water dehydratable from the colloidal zirconia is expressed in weight percent given by $(H/W_1)\times 100$.

In the process, the starting sol or the slurry is calcined, or preferably the powder of colloidal zirconia obtained by drying the starting sol is calcined in a container such as a ceramic or metallic container in an electric furnace or a gas furnace. Calcining is preferably started by raising the temperature at a speed of 1° to 10° C. per minute, and the calcining is carried out at a temperature of 400° to 1,000° C., preferably 500° to 950° C. and more preferably 600° to 900° C. to form a calcined zirconia. The calcined zirconia has a characteristic that when the calcined zirconia is dried at 150° C. for 3 hours to obtain a dried powder, the calcined zirconia powder exhibits a decrease in weight, by dehydration, of 0.1 to 2, preferably 0.1 to 1.5 and more preferably 0.1 to 1% based on the powder when the powder is fired at 1,100° C. for 1 hour. In other words, the calcined zirconia has a dehydratable water content of 0.1 to 2, preferably 0.1 to 1.5, most preferably 0.1 to 1% by weight. It is preferable to complete the calcining within a time of 0.05 to 50 hours at a temperature of 400° to 1,000° C., and it is most preferable to complete the calcining in a shorter time at a higher temperature. The zirconia after calcining is cooled to a room temperature.

The amount (Q) of water which is dehydratable from the calcined zirconia obtained by calcining is also obtained likewise as above, i.e., from the weight ($W_3$) of the calcined zirconia and the volatile content ($C_3$) other than $H_2O$ after drying at 150° C. for 3 hours and the weight ($W_4$) of the zirconia and the volatile content ($C_4$) other than $H_2O$ after firing at 1,100° C. for 1 hour, according to the equation $Q=(W_3-C_3)-(W_4-C_4)$. The amount of water dehydratable from the calcined zirconia is expressed in weight percent given by $(Q/W_3)\times 100$. The calcined zirconia has a lowered specific surface area as compared to that of the colloidal zirconia before the calcining.

The calcined zirconia is then pulverized in water at a $ZrO_2$ concentration of 5 to 80, preferably 10 to 60 and more preferably 20 to 50% by weight of $ZrO_2$ in the calcined zirconia. A stable sol of colloidal zirconia in an acidic form is obtained by pulverizing the calcined zirconia in water containing an acid in an amount of 0.01 to 100, preferably 0.03 to 50 and more preferably 0.05 to 30 milli equivalent to 1 mol of $ZrO_2$ in the calcined zirconia. The acidic sol has a pH of 1 to 6, preferably 2 to 6 and more preferably 3 to 6. A stable sol of colloidal zirconia in an alkaline form is obtained by pulverizing the calcined zirconia in water containing an alkali in an amount of 1 to 100, preferably 3 to 50 and more preferably 5 to 30 milli equivalent to 1 mol of $ZrO_2$ in the calcined zirconia. The alkaline sol has a pH of 8 to 13.5, preferably 9 to 13 and more preferably 10 to 13. Another stable sol of colloidal zirconia in an alkaline form is obtained by adding an alkaline substance to the acidic sol prepared above.

The water-soluble acid in the sol may be an inorganic acid such as, for example, hydrogen chloride, nitric acid, sulfuric acid, or an organic acid such as, for example, formic acid, acetic acid, oxalic acid, tartaric acid, citric acid, lactic acid, or an acidic salt thereof. The water-soluble alkali in the sol may be a hydroxide of a metal such as, for example, sodium, potassium or lithium, a hydroxide of quaternary ammonium such as, for example, tetraethanol ammonium, monomethyltriethanol ammonium, tetramethyl ammonium or trimethylbenzyl ammonium, or an amine such as, for example, monoethanol amine, diethanol amine, triethanol amine, aminoethylethanol amine, N,N-dimethylethanol amine, N-(β-aminomethyl)ethanol amine, N-methylethanol amine, monopropanol amine or morpholine, or ammonia.

The pulverizing may be carried out further in the presence of an additive of a type of a high polymer soluble in water such as, for example, xanthan gum, locust bean gum, guar gum, carboxymethyl cellulose, methyl cellulose, hydroxyethyl cellulose, polyvinyl alcohol, sodium polyacrylate, polyethylene oxide or the like, or a polyhydric alcohol such as, for example, glycerin, propylene glycol, ethylene glycol or the like.

The pulverizing may be carried out in a mill such as, for example, a ball mill, sand mill or attrition mill, and is continued for a time until an aqueous sol of colloidal zirconia having a particle size of 1 to 3, preferably 1 to 2.5 and more preferably 1 to 2 times the particle size of the colloidal zirconia before calcining is formed. The pulverizing may usually be completed in, for example, 20 to 100 hours by ball milling.

The high polymer soluble in water such as xanthan gum, locust bean gum or guar gum may be effectively added to a sol formed by pulverizing in the absence of such materials, in order to prepare a preferable sol of colloidal zirconia which has an elevated viscosity.

The colloidal zirconia in the sol obtained following pulverizing has a specific surface area of 5 to 200 $m^2/g$ as measured by the nitrogen gas adsorption method and a particle size of 20 to 1,500 nm as measured by the dynamic light scattering method, and the colloidal zirconia in the sol has a characteristic that when the sol is dried at 150° C. for 3 hours to obtain a powder of colloidal zirconia, the powder shows a decrease by dehydration from the colloidal zirconia in weight of 0.1 to 3, preferably 0.1 to 2.5 and more preferably 0.1 to 2% based on the powder of colloidal zirconia when the powder of colloidal zirconia is fired at 1,100° C. for 1 hour. In other words, the colloidal zirconia in the product sol shows a dehydratable water content of 0.1 to 3, preferably 0.1 to 2.5 and more preferably 0.1 to 2% by weight. The amount of water which is dehydratable from the powder when the powder is fired is obtained in the same manner as in the colloidal zirconia in the starting sol as described above.

The sol contains the colloidal zirconia in an amount of 5 to 80% by weight as $ZrO_2$. The sol contains a water-soluble acid in an amount of 0.01 to 100 milli equivalent or a water-soluble alkali in an amount of 1 to 100 milli equivalent, each to 1 mol of $ZrO_2$ of the colloidal zirconia in the sol.

The colloidal zirconia in a sol obtained following pulverizing has a remarkably lowered surface activity as compared to the colloidal zirconia in the starting sol, and the sol is stable and has a $ZrO_2$ concentration of 5 to 80% by weight and an acidic pH of 1 to 6 or an alkaline pH of 8 to 13.5.

The sol of colloidal zirconia obtained following pulverizing may, if desired, be purified by deionizing the sol through ion exchange resins or by ultrafiltering the sol.

It was found that the colloidal zirconia formed by a process comprising heating at 120° to 150° C. an aqueous solution of a salt of zirconium as is shown in U.S. Pat. No. 2,984,628 has a large value of A×D, such as 10,000, which is far beyond the upper limit value of 2,000 described in the U.S. Patent specification, and that the colloidal zirconia formed by the process does not have a dense structure because the colloidal zirconia has a far greater specific surface area, as measured by the nitrogen gas adsorption method, than the specific surface area calculated from the mean particle size measured by an electronic microscope or a dynamic light scattering method. It was further found that the colloidal zirconia formed by the process shows a decrease by dehydration therefrom in weight of, for example, 7% when the colloidal zirconia is fired at a high temperature, that the zirconia after calcining at, for example, 800° C. has a specific surface area greatly lower than that of the colloidal zirconia before the calcining even though the calcining changes little the particle size of the colloidal zirconia, and that the colloidal zirconia formed by the process has such a high surface activity that the colloidal zirconia adhered to a surface of a material, such as for example after polishing the surface with the colloidal zirconia, is not removed from the surface even when the surface is cleansed in water.

It is believed that the colloidal zirconia formed by such prior art process is in a form of an ultimate particle which is composed of fine particles of zirconia in a form of aggregation thereof, that the fine particle of zirconia has on the surface of the particle many OH groups bonded to Zr atoms which give the high surface activity to the particle, and that some of the fine particles change to unify to an enlarged particle, and the fine particles in the adjacent colloidal particles of zirconia link together with each other upon the calcining of the colloidal zirconia.

It is, therefore, believed that the decrease in weight of the colloidal zirconia which occurs upon the calcining in the present invention is owing to a condensation reaction of the OH groups bonded to Zr atoms, resulting in release of water formed by the dehydrative reaction from the colloidal zirconia, that the calcining causes growing of the fine particles to an enlarged particle of zirconia which has a lowered surface activity owing to the greatly reduced number of OH groups in a unit weight of zirconia, but that the calcining is not so strong as to cause an entire lattice structure having chemical bonding expressed as Zr—O—Zr between the fine particles of zirconia, because the calcined zirconia formed by the calcining can be pulverized by a mechanical power externally exerted on the particle, but cannot so finely be divided as forming a particle smaller than the colloidal zirconia before the calcining. It is also believed that the acid or the alkali present in the water in the pulverizing step serves as a stabilizer for dispersing stably in water the particles of colloidal zirconia formed by the pulverizing.

However, a preferred sol of colloidal zirconia is prepared by a preferred method according to the present invention.

A starting colloidal zirconia having a specific surface area smaller than 10 $m^2/g$ or larger than 400 $m^2/g$ is not preferable for use in calcining, since a specific surface area smaller than 10 $m^2/g$ does not give a stable product of sol following the pulverizing step, and a specific surface area larger than 400 $m^2/g$ does not give a product of colloidal zirconia having a lowered surface activity following the pulverizing step. A colloidal zirconia having a particle size smaller than 20 nm or larger than 500 nm is also not preferable for use in calcining, since a size smaller than 20 nm tends to cause sintering of zirconia during calcining, and a size larger than 500 nm tends to form a product of colloidal zirconia which precipitates unstably in the product of sol.

A temperature below 400° C. or higher than 1,000° C. at which the colloidal zirconia is calcined is not preferable, since a temperature lower than 400° C. does not produce a product of colloidal zirconia lower in surface activity following the pulverizing step, and a temperature higher than 1,000° C. produces, following the pulverizing step, a product of colloidal zirconia which is not stably dispersible in the product sol. A temperature higher than 900° C., especially higher than 950° C. during calcining tends to produce disadvantageously following the pulverizing step a colloidal zirconia having a particle size deviated largely from the size of the colloidal zirconia before the calcining, and a temperature lower than 600° C., especially lower than 500° C. in calcining tends to give disadvantageously following the pulverizing step a colloidal zirconia which shows a decrease by dehydration in weight deviated largely from (i.e., greater than) 3%.

A time shorter than 0.05 hours or longer than 50 hours for calcining is not preferable, since a time shorter than 0.05 hours does not give reproducibility in processing and a time longer than 50 hours does not give any additional advantage and makes the process inefficient.

A calcined zirconia which has a dehydratable water content in weight less than 0.1% or greater than 2% is not preferable, since a dehydratable water content less than 0.1% does not give a product of colloidal zirconia stably dispersible in the product sol, and a dehydratable water content greater than 2% does not give a product of colloidal zirconia having a lowered surface activity.

An amount of acid less than 0.01 milli equivalent or an amount of alkali less than 1 milli equivalent to 1 mol of $ZrO_2$ in the pulverizing step is not preferable, since the acid or the alkali in such amount cannot sufficiently disperse the colloidal zirconia during pulverizing. An amount of acid or alkali greater than 100 milli equivalent to 1 mol of $ZrO_2$ in the pulverizing step does not give a stable product of sol and the colloidal zirconia in the product tends to aggregate in the sol.

A $ZrO_2$ concentration less than 5% by weight or higher than 80% by weight in the pulverizing step is not preferable, since the product sol with a concentration less than 5% by weight will usually require subsequent concentration of the sol and makes the process inefficient, and a concentration higher than 80% by weight gives a product of sol which can not attain a stable dispersion of the colloidal zirconia in the sol.

The pulverizing step cannot give a colloidal zirconia having a particle size smaller than that of colloidal zirconia in the starting sol. A colloidal zirconia following the pulverizing step having a particle size larger than 3 times that of colloidal zirconia in the starting sol tends to precipitate in the product sol.

The stable aqueous sol of colloidal zirconia according to the present invention may be acidic or alkaline and can contain organic additives soluble in water, and may be supplied as an industrial product. The sol can be applied in various fields such as, for example, a binder for making a shell mold having an enhanced refractoriness for use in precision molding, an abrasive contained in an aqueous medium for use in abrasive jet-cutting a material such as, for example, metal, ceramic or concrete, or a polishing agent for polishing in crude, in precise or mirror-like a surface of various materials, and so forth.

It will be apparent that the sol is useful for polishing a surface of a semiconductor such as, for example, silicon, germanium or a compound of a type in III-V series, II-VI series or I-VII series; a surface of quartz for use in optical fiber, glass for use in liquid crystal cell, lithium niobate or tantalate for use in optical ceramics; a surface of crystal, aluminum nitride, alumina, ferrite or zirconia for use in parts of an electrical product; a surface of interlayer dielectric film among multi-level interconnection or a interconnect of a metallic material such as aluminum, copper, tungsten or an alloy thereof in semiconductor device; and a surface of super-hard alloy such as tungsten carbide.

The sol of colloidal zirconia according to the present invention may stably be mixed with another sol of an oxide of a metal other than Zr in any desired ratio, for example, 10 to 90 parts by weight of the oxide to 100 parts by weight of the zirconia, so long as the electric charge on the surface of the colloidal particle of the oxide is the same as that of the colloidal particle of zirconia. Thus, a sol may be obtained, for example, by mixing the aqueous sol of colloidal zirconia in alkaline form with an aqueous sol of colloidal silica in alkaline form or by mixing the aqueous sol of colloidal zirconia in acidic form with an aqueous sol of colloidal alumina in acidic form. The sol in mixture may also be useful for polishing a surface of semiconductor or a surface of interlayer dielectric film among multi-level interconnection or a interconnect of a metallic material in various semiconductor devices as mentioned above.

EXAMPLE I

In this example is prepared a starting sol ($S_1$) of colloidal zirconia in acidic form and a powder ($P_1$) of the colloidal zirconia.

An aqueous solution of zirconium oxychloride is prepared by dissolving 1,000 g of zirconium oxychloride to 2,100 g of pure water. To all of the solution is added under agitation 264 g of aqueous solution of ammonia having a concentration of 25% by weight. All of the zirconium oxychloride solution containing the ammonia is heated in an autoclave at 130° C. for a time of 7 hours, and then the liquid in the autoclave is cooled to a room temperature and recovered. The recovered liquid has a pH below 1 and is an aqueous sol of colloidal zirconia having a particle size of 89 nm as measured by a dynamic light scattering method in which an apparatus named $N_4$ manufactured by Coulter Company of the U.S.A. is used. The colloidal zirconia has a mean particle size of 100 nm in a photograph taken through an electronic microscope.

To 3,200 g of the recovered sol is added 11.7 g of an aqueous solution of ammonia having a concentration of 25% by weight to form an aqueous sol of colloidal zirconia having a pH of 5.2. To the sol having a pH of 5.2 is added pure water and then the diluted sol is concentrated through an ultrafilter. The dilution and the subsequent ultrafiltration are repeated in which 28 kg in total of pure water is added to the sol. There is obtained 910 g of a purified sol ($S_1$) of colloidal zirconia having a pH of 4.6, a $ZrO_2$ concentration of 38% by weight, a Cl concentration of 0.88% by weight and an $NH_3$ concentration below 0.1% by weight.

The sol ($S_1$) is dried in a spray dryer at an inlet temperature of 190° C. and an outlet temperature of 100° C. to form a powder ($P_1$) of the colloidal zirconia which has a specific surface area of 128 $m^2/g$ as measured by the $N_2$ gas adsorption method.

The calculation 100 (nm) multiplied by 128 ($m^2/g$) of the colloidal zirconia yields a value of 12,800. It is found that the colloidal zirconia has a surprisingly large value of 12,800, well beyond the upper limit of 2,000 indicated in the specification of U.S. Pat. No. 2,984,628.

The powder ($P_1$) is dried at 150° C. for 3 hours in a dryer. The powder after drying contains a Cl content of 2.28% by weight according to a chemical analysis.

Then 11.085 g of the powder after drying is fired at a temperature of 1,100° C. for 1 hour in an electric furnace. There is obtained 10.150 g of a powder of zirconia after firing. A chemical analysis gave a Cl content below 0.01% by weight in the powder after firing. From the decrease in weight of the powder upon firing, it is found that the powder ($P_1$) of colloidal zirconia is dehydrated by 6.2% by weight of water, based on the powder prepared by drying the powder ($P_1$) at 150° C. for 3 hours, when the powder after drying is fired at 1,100° C. for 1 hour.

EXAMPLE 2

In this example is prepared a starting sol ($S_2$) of colloidal zirconia in alkaline form and a powder ($P_2$) of the colloidal zirconia.

A purified sol ($S_1$) of colloidal zirconia having a pH of 4.6 is prepared in the same manner as in Example 1.

To 1,000 g of the sol ($S_1$) is added under agitation 31 g of citric acid and subsequently 39 g of an aqueous solution of ammonia having a concentration of 25% by weight. To the sol containing the citric acid and the ammonia is added pure water, and then the diluted sol is concentrated through an ultrafilter.

The dilution and the subsequent ultrafiltration are repeated in which 7.8 kg in total of pure water is added to the sol. There is obtained 1,050 g of a purified sol ($S_2$) of colloidal zirconia having a pH of 8.6, a $ZrO_2$ concentration of 36% by weight, a Cl concentration below 0.01% by weight, a citric acid concentration of 2.5% by weight and an $NH_3$ concentration of 0.08% by weight. The colloidal zirconia in the sol has a particle size of 104 nm as measured by apparatus $N_4$.

The sol ($S_2$) is dried in a spray dryer at an inlet temperature of 190° C. and an outlet temperature of 100° C. to form a powder ($P_2$) of the colloidal zirconia which has a specific surface area of 135 $m^2/g$ as measured by the $N_2$ gas adsorption method.

The powder ($P_2$) is dried at 150° C. for 3 hours in a dryer. The powder after drying contains a citric acid content of 6.88% by weight, a Cl content below 0.01% by weight and an $NH_3$ content below 0.01% by weight according to a chemical analysis. Then, 11.713 g of the powder after drying is fired at a temperature of 1,100° C. for 1 hour in an electric furnace. There is obtained 10.162 g of a powder of zirconia after firing. The powder obtained contains citric acid in an amount less than 0.01% by weight.

It is found that the powder ($P_2$) of colloidal zirconia is dehydrated by 6.4% by weight of water, based on the powder prepared by drying the powder ($P_2$) at 150° C. for 3 hours, when the powder after drying is fired at 1,100° C. for 1 hour.

EXAMPLE 3

In this example is calcined the powder ($P_2$) of colloidal zirconia at various conditions to form calcined zirconia, and the calcined zirconia is pulverized in water.

The powder ($P_2$) is calcined in an electric furnace at a temperature and for a time described in Table 1 to form a calcined zirconia ($T_1$) to ($T_6$) in which ($T_6$) is a Comparative Example.

The zirconia ($T_1$) contains 30 ppm by weight of Cl according to a chemical analysis.

A specific surface area (s. s. area in $m^2/g$) of each calcined zirconia ($T_1$) to ($T_6$) is measured, and decrease in weight (dehydrated water %) of each zirconia ($T_1$) to ($T_6$) is obtained by a method likewise to that above, i.e., by firing the calcined zirconia at 1,100° C. for 1 hour after drying the calcined zirconia ($T_1$) to ($T_6$) at 150° C. for 3 hours. The results are shown in Table 1.

TABLE 1

| Calcined zirconia | Temperature (°C.) | Time (hour) | s. s. area ($m^2/g$) | Dehydrated water (%) |
|---|---|---|---|---|
| $T_1$ | 500 | 0.1 | 60.5 | 1.2 |
| $T_2$ | 750 | 2 | 20.1 | 0.35 |
| $T_3$ | 950 | 2 | 14.8 | 0.16 |
| $T_4$ | 500 | 0.1 | 60.5 | 1.2 |
| $T_5$ | 500 | 0.1 | 60.5 | 1.2 |
| $T_6$ | 1200 | 2 | 4.8 | below 0.1 |

There is prepared 204 g of an aqueous solution of hydrogen chloride containing therein 0.2 milli equivalent HCl by dissolving a hydrochloric acid pure in high degree into a pure water.

Then 96 g of the zirconia ($T_1$), 204 g of the prepared aqueous solution of hydrogen chloride and 700 g of hard beads of zirconia having a diameter of 5 mm are charged into a mill having a diameter of 8 cm. The mill is sealed and revolved for a time of 92 hours at a rate of 200 rpm. From the mill is recovered 290 g of a stable aqueous sol ($Z_1$) of colloidal zirconia having a pH of 5.4 and a $ZrO_2$ concentration of 31% by weight.

The particle size of colloidal zirconia in the sol ($Z_1$) is 152 nm as measured by apparatus $N_4$.

The sol ($Z_1$) is dried in a spray dryer at an inlet temperature of 190° C. and an outlet temperature of 100° C. to form a powder of the colloidal zirconia. The powder shows a specific surface area of 61.8 $m^2/g$ as measured by the $N_2$ gas adsorption method.

It is found that the milling causes pulverizing of the calcined zirconia to a colloidal zirconia having a particle size of 152 nm, which is 1.5 times the size of 104 nm of the colloidal zirconia in the sol ($S_2$), though the specific surface area of 61.8 $m^2/g$ of the colloidal zirconia in the sol ($Z_1$) is little changed as compared to the specific surface area of 60.5 $m^2/g$ of the calcined zirconia ($T_1$).

Then the powder having a specific surface area of 61.8 $m^2/g$ is dried in a dryer at 150° C. for 3 hours. The powder after drying contains citric acid in an amount below 0.1% by weight according to a chemical analysis. 10.173 g of a zirconia after firing is obtained by firing 10.447 g of the powder at 1,100° C. for 1 hour. It is found that the colloidal zirconia in the sol ($Z_1$) is dehydrated by 2.6% by weight of water, based on the powder of colloidal zirconia which is prepared by drying the powder obtained in the spray dryer at 150° C. for 3 hours, when the powder after drying is fired at 1,100° C. for 1 hour.

EXAMPLE 4

The calcined zirconia ($T_2$) to ($T_6$) each is pulverized in water in the presence of an acid or an alkali in the amount of milli equivalent (milli equiv.) shown in Table 2 similar to Example 3. From the zirconia ($T_2$) to ($T_5$) is obtained a stable aqueous sol ($Z_2$) to ($Z_5$), but the zirconia ($T_6$) gave an aqueous slurry. The specific surface area of the colloidal zirconia in the sol each is changed little as compared to that of corresponding zirconia ($T_2$) to ($T_5$). The specific surface area of the zirconia formed by pulverizing zirconia ($T_6$) in the slurry is 7.2 $m^2/g$, which is somewhat larger than 4.8 $m^2/g$ of the zirconia ($T_6$).

The particle size of the colloidal zirconia in the sols each is measured by apparatus $N_4$, and listed in Table 2.

The amount of water dehydrated from the colloidal zirconia in the sol and the formed zirconia by pulverizing zirconia ($T_6$) in the slurry each is measured similar to Example 3, and the results are shown in Table 2.

TABLE 2

| Obtained product | Calcined zirconia | Acid or Alkali | (milli equiv.) | Particle size (nm) | Dehydrated water (%) |
| --- | --- | --- | --- | --- | --- |
| $Z_1$ | $T_1$ | HCl | 0.2 | 152 | 2.6 |
| $Z_2$ | $T_2$ | HCl | 0.2 | 190 | 0.81 |
| $Z_3$ | $T_3$ | HCl | 0.2 | 213 | 0.56 |
| $Z_4$ | $T_4$ | $HNO_3$ | 0.2 | 163 | 2.5 |
| $Z_5$ | $T_5$ | KOH | 10.0 | 212 | 2.6 |
| slurry | $T_6$ | HCl | 0.2 | — | below 0.1 |

EXAMPLE 5

In this example is prepared an alkaline sol of colloidal zirconia from a sol ($Z_1$).

To 1,000 g of a sol ($Z_1$) prepared as in Example 3 is added 1,000 g of a pure water to form a diluted sol of colloidal zirconia having a $ZrO_2$ concentration of 15% by weight. Then 36 g of an aqueous solution of potassium hydroxide having a concentration of 5% by weight is added to all of the diluted sol, and the resulting sol is strongly stirred at room temperature for a time of 4 hours. There is obtained a stable alkaline sol of colloidal zirconia having a pH of 10.4. A concentrated sol of the colloidal zirconia having a $ZrO_2$ concentration of 20% by weight is prepared by removing by distillation the water from the sol having a pH of 10.4.

EXAMPLE 6

In this example is tested the surface activity of colloidal zirconia in the sol ($Z_3$) in comparison with that of comparative example of starting sol ($S_1$).

The sol ($Z_3$) and the sol ($S_1$) each is coated on the surface of a transparent glass plate having a length of 7.5 cm and a width of 2.5 cm, and dried in a room environment, resulting in adhering of the colloidal zirconia to the surface of the glass plate.

Then ultrasonic vibrations at 28 kHz (kilohertz) and a power of 210 W (watt) are added to water in which the glass plate is dipped at room temperature for a time of 60 minutes. The adhered colloidal zirconia in the sol ($Z_3$) is removed from the surface of the glass plate, while the adhered colloidal zirconia in the sol ($S_1$) is hardly removed from the glass plate.

What is claimed is:

1. A method of preparing a stable aqueous sol of colloidal zirconia having a specific surface area of 5 to 200 $m^2/g$, a particle size of 20 to 1,500 nm and a dehydratable water content of 0.1 to 3 percent by weight, said sol containing the colloidal zirconia in an amount of from 5 to 80 percent by weight as $ZrO_2$, and said sol further containing a water-soluble acid in an amount of from 0.01 to 100 milli equivalent per 1 mol of $ZrO_2$ of the colloidal zirconia, comprising:

calcining a colloidal zirconia of a starting aqueous zirconia sol, wherein said colloidal zirconia has a specific surface area of from 10 to 400 $m^2/g$, a particle size of from 20 to 500 nm, and a dehydratable water content of from 4 to 15 percent by weight, at a temperature of from 400° C. to 1,000° C. for 0.05 to 50 hours to form a calcined zirconia having a dehydratable water content of from 0.1 to 2 percent by weight, and pulverizing the calcined zirconia in water and in the presence of a water-soluble acid, said calcined zirconia being present in the water in a concentration of from 5 to 80 percent by weight of $ZrO_2$ in the calcined zirconia, and said water-soluble acid being present in an amount of from 0.01 to 100 milli equivalent per 1 mol of $ZrO_2$ in the calcined zirconia, said pulverizing continuing until an aqueous sol containing colloidal zirconia having a particle size of from 1 to 3 times the particle size of the colloidal zirconia before calcining is formed.

2. A method of preparing a stable aqueous sol of colloidal zirconia as claimed in claim 1, wherein the water-soluble acid is selected from the group consisting of hydrogen chloride, nitric acid, sulfuric acid, formic acid, acetic acid, oxalic acid, tartaric acid, citric acid, lactic acid and acidic salts of the foregoing water-soluble acids.

3. A method of preparing a stable aqueous sol of colloidal zirconia as claimed in claim 1, wherein prior to calcining the colloidal zirconia, the colloidal zirconia of the starting aqueous sol is obtained in powder form by drying a starting aqueous sol at 80° C. to 200° C. until said colloidal zirconia powder is formed.

4. A method of preparing a stable aqueous sol of colloidal zirconia as claimed in claim 1, wherein the temperature of calcining is from 500° to 950° C.

5. A method of preparing a stable aqueous sol of colloidal zirconia having a specific surface area of 5 to 200 $m^2/g$, a particle size of 20 to 1,500 nm and a dehydratable water content of 0.1 to 3 percent by weight, said sol containing the colloidal zirconia in an amount of from 5 to 80 percent by weight as $ZrO_2$, and said sol further containing a water-soluble alkali in an amount of from 1 to 100 milli equivalent per 1 mol of $ZrO_2$ of the colloidal zirconia, comprising:

calcining a colloidal zirconia of a starting aqueous zirconia sol, wherein said colloidal zirconia has a specific surface area of from 10 to 400 $m^2/g$, a particle size of from 20 to 500 nm, and a dehydratable water content of from 4 to 15 percent by weight, at a temperature of from 400° C. to 1,000° C. for 0.05 to 50 hours to form a calcined zirconia having a dehydratable water content of from 0.1 to 2 percent by weight, and pulverizing the calcined zirconia in water and in the presence of a water-soluble alkali, said calcined zirconia being present in the water in a concentration of from 5 to 80 percent by weight of $ZrO_2$ in the calcined zirconia, and said water-soluble alkali being present in an amount of from 1 to 100 milli equivalent per 1 mol of $ZrO_2$ in the calcined zirconia, said pulverizing continuing until an aqueous sol containing colloidal zirconia having a particle size of from 1 to 3 times the particle size of the colloidal zirconia before calcining is formed.

6. A method of preparing a stable aqueous sol of colloidal zirconia as claimed in claim 5, wherein the water-soluble alkali is selected from the group consisting of ammonia, sodium hydroxide, potassium hydroxide, lithium hydroxide, tetraethanol ammonium hydroxide, monomethyltriethanol ammonium hydroxide, tetramethyl ammonium hydroxide, trimethylbenzyl ammonium hydroxide, monoethanol amine, diethanolamine, triethanol amine, aminoethylethanol amine, N,N-dimethylethanol amine, N-(β-aminomethyl)ethanol amine, N-methylethanol amine, monopropanol amine and morpholine.

7. A method of preparing a stable aqueous sol of colloidal zirconia as claimed in claim 5, wherein prior to calcining the colloidal zirconia, the colloidal zirconia of the starting aqueous sol is obtained in powder form by drying a starting aqueous sol at from 80° C. to 200° C. until said colloidal zirconia powder is formed.

8. A method of preparing a stable aqueous sol of colloidal zirconia as claimed in claim 5, wherein the temperature of calcining is from 500° to 950° C.

* * * * *